Figures 1, 2:
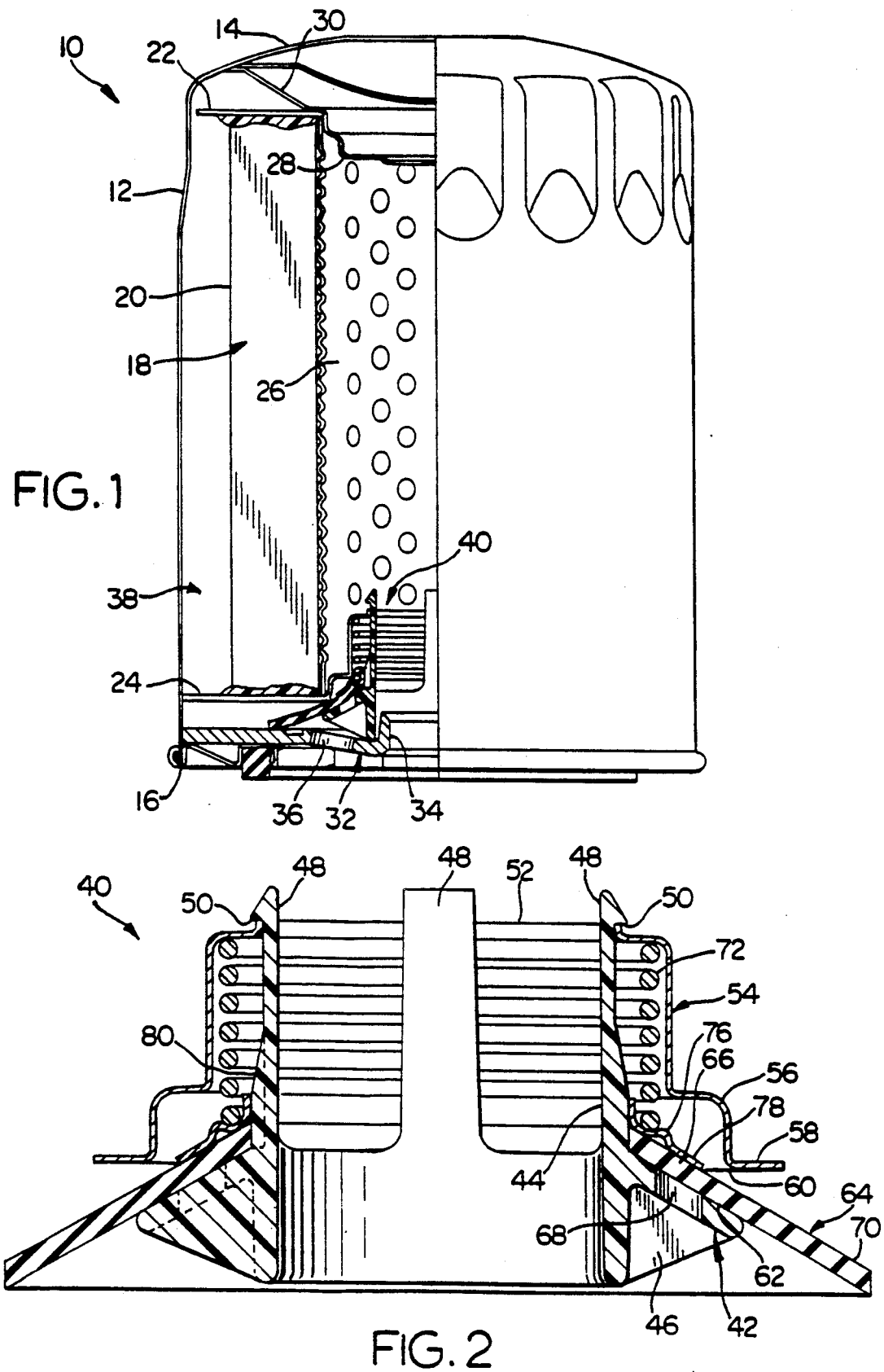

United States Patent [19]

Anderly et al.

[11] Patent Number: 5,256,280
[45] Date of Patent: Oct. 26, 1993

[54] COMBINATION VALVE FOR LIQUID FILTER

[75] Inventors: Glenn C. Anderly, East Providence, R.I.; Joseph Machado, Attleboro Falls, Mass.

[73] Assignee: Allied-Signal Inc., Morristown, N.J.

[21] Appl. No.: 958,894

[22] Filed: Oct. 9, 1992

[51] Int. Cl.$^5$ .......................................... B01D 35/147
[52] U.S. Cl. .................................... 210/130; 210/168; 210/416.5; 210/418; 210/450
[58] Field of Search .................. 210/350-352, 210/418-420, 422-432, 435, 437-454, 455-457, 487, 97, 130, 133, 137, 168, 416.5, 209

[56] References Cited

U.S. PATENT DOCUMENTS

| | | |
|---|---|---|
| 3,235,085 | 2/1966 | Humbert, Jr. |
| 3,305,095 | 2/1967 | Hathaway |
| 3,332,554 | 7/1967 | Humbert, Jr. |
| 3,529,722 | 9/1970 | Humbert, Jr. |
| 3,567,022 | 3/1971 | Thornton et al. |
| 3,589,517 | 6/1971 | Palmai |
| 4,028,243 | 6/1977 | Offer et al. |
| 4,045,349 | 8/1977 | Humbert, Jr. |
| 4,075,097 | 2/1978 | Paul ................................. 210/209 |
| 4,853,118 | 8/1989 | Brownell et al. |
| 4,872,976 | 10/1989 | Cudaback |

Primary Examiner—Frank Sever
Attorney, Agent, or Firm—Ken C. Decker; William N. Antonis

[57] ABSTRACT

A liquid filter includes an annular filter cartridge and a combination anti-drain back and relief valve assembly. The combination valve includes a valve seat from which axially extending arms extend and a spring retainer and spring which holds a gasket against the valve seat. The gasket includes an anti-drainback portion which projects from the valve seat and a relief valve portion which is supported on the valve seat. Upon assembly the combination valve and filter element in the housing, the filter assembly is supported by the spring retainer and is forced into sealing engagement with the gasket, holding the latter against the valve seat in a gasket engaging area between the relief valve portion and the anti-drainback portion. This assembly process also removes the coil spring load from the barbs on the valve seat arms. The spring retainer is designed such that the range of movement relative to the valve seat is limited during handling before and during assembly of the liquid filter, thereby preventing over compression of the spring so that the spring force is consistent, thereby resulting in a consistent opening pressure of the relief valve.

8 Claims, 1 Drawing Sheet

COMBINATION VALVE FOR LIQUID FILTER

This invention relates to a liquid filter in a combination anti-drainback and relief valve therefore.

Liquid filters, such as those used for filtering the lubricating oil of an internal combustion engine, include a metal cup shaped housing having an open end through which an annular filter element is installed in the housing before the housing is sealed by securing a metal tapping plate to the open end. The metal tapping plate includes an outlet opening which is "spun on" a conventional mounting stud provided on the engine. The outlet opening is circumscribed by a series of circumferentially spaced inlet openings. In order to assure that lubricating oil does not drain back out of the housing through the inlet openings when the engine is turned off, it has become conventional to provide liquid filters of this general type with a so-called anti-drainback valve. Since it is also necessary to bypass the lubricating oil directly from the inlet openings to the outlet opening during cold weather starts or when oil is too thick to penetrate the filter element or when the filter element becomes clogged, it is also necessary to provide a relief valve which opens at a predetermined pressure differential across the filter element.

A combination relief and anti-drainback valve of a type known in the prior art is disclosed in U.S. Pat. No. 3,567,022. The present invention relates to an improved and simplified combination anti-drainback and relief valve that has a minimum number of parts and which can be assembled easily by either slipping or snapping the parts together. Furthermore, the combination valve according to the present invention may be easily modified to accommodate different filter housing sizes, so that a combination valve can be used in small filter sizes which currently require a separate anti-drainback valve and dome end relief valve mounted in the opposite end of the filter element. Furthermore, the parts of the combination valve according to the present invention are relatively simple. For example, the gasket may be lathe-cut instead of molded, and the gasket thickness and diameter, may be changed at minimal expense. Still further, the opening pressure of the relief valve is consistent because the spring controlling the relief valve cannot be compressed beyond its application length or to a solid height during handling during filter manufacture, thereby reducing the chance of the spring taking a set.

These and other advantages of the present invention will become apparent from the following specification, with reference to the accompanying drawings, in which:

FIG. 1 is a longitudinal cross-sectional view of a liquid filter having a combination valve made pursuant to the present invention; and FIG. 2 is a cross-sectional view of a combination valve made pursuant to the present invention before installation in the liquid filter housing.

Referring now to the drawings, a liquid filter generally indicated by the numeral 10 includes a cup-shaped housing 12 having a closed dome end 14 and an opposite open end 16. An annular filter cartridge generally indicated by the numeral 18 includes a circumferentially extending array of pleated paper 20. The upper and lower ends of the array 20 are sealed by an adhesive carried by upper and lower end discs 22, 24. A conventional perforated metal centertube 26 resists inward collapse of the array 20 in a manner well known to those skilled in the art. The upper end of the centertube is closed by centertube cap 28 which is integral with a leaf spring 30 which engages the dome end 14 of the housing 12 when the cartridge 18 is installed therein to exert a downward biasing force on the array viewing FIG. 1.

The open end 16 of the housing 12 is closed by a conventional tapping plate or closure member assembly generally indicated by the numeral 32. The tapping plate 32 includes a threaded central opening generally indicated by the numeral 34 which is substantially coaxial with the housing 12 and which is threaded to be screwed or "spun on" a standard filter mounting stud (not shown) provided by the manufacture of the engine for installation of the liquid filter 10. The opening 34 is circumscribed by circumferentially spaced inlet openings generally indicated by the numeral 36. The outlet opening 34 communicates with the chamber defined within the centertube 26, and the inlet openings 36 communicate with an inlet chamber generally indicated by the numeral 38 defined between the outer circumferential edges of the pleats comprising the array 20 and the housing 12.

A combination relief and anti-drainback valve generally indicated by the numeral 40 prevents drain back of oil from the chamber 38 through the inlet openings 36 when the engine is turned off and also controls communication through a bypass passage around filter cartridge 18 when the pressure differential across the cartridge exceeds a predetermined level. Referring now to FIG. 2 of the drawings, the combination valve 40 includes a circumferentially extending, downwardly (viewing FIG. 2) tapering valve seat 42 which projects from a circumferentially extending support 44 which circumscribes the outlet opening 34 and is supported on support 44 by circumferentially spaced struts 46. Circumferentially spaced, radially deflectable arms 48 project axially from the support 44. The arms 48, support 44, struts 46 and valve seat 42 are molded integrally from plastic or another suitable material. Each of the arms 48 terminate in radially outwardly projecting detents or barbs 50 which define a stop surface adapted to engage a corresponding circumferentially extending stop surface 52 on a spring retainer generally indicated by the numeral 54. Spring retainer 54 includes a stepped portion 56 which terminates in a filter engaging surface 58 which is adapted to engage the circumferentially extending portion of the lower end cap 24 adjacent the centertube 26 when the filter element 18 and the combination valve 40 are installed within the housing 12. Spring retainer 54 further includes a gasket engaging surface 60 which is adapted to engage a gasket engaging area 62 of a circumferentially extending resilient gasket generally indicated by the numeral 64. Gasket 64 includes a relief valve portion 66 which extends radially inwardly from the gasket engaging area 62 to normally close circumferentially spaced relief openings 68 extending through valve seat 42. The gasket 64 further includes anti-drainback portion 70 which extends radially outwardly from the gasket engaging area 62. Accordingly, the gasket engaging area 62 is adopted to be engaged by the gasket engaging surface 60 of the spring retainer 54, and divides the gasket 64 into the relief valve portion 66 and the anti-drainback portion 70. The relief valve portion is yieldably maintained in sealing engagement with the valve seat 42 to normally prevent communication through the openings 68 by a coiled spring 72 that circumscribes the arms 48 and extends between engagement surface 74 on the retainer 54 and a circumferentially extending bearing plate 76 which also circumscribes the arms 48 and defines a circumferentially extending surface 78 which bears against the relief valve portion 66 of the gasket 70.

In operation, it will be noted that each of the arms 48 include tapered portions 80 so that the gasket 64 can be slipped over the upper ends of the arms during assembly of the combination valve. The gasket itself if lathe cut to shape for ease of manufactured, and the gasket thickness and outer diameter may be changed at minimal expense. Accordingly, the components of the combination valve 40 are first assembled, and then the completed combination valve 40 is installed with the filter cartridge into the housing 12 which will hereinafter be described. Because of the tapered portions 80 of the legs 48, both the gasket 64 and the bearing plate 76 are slipped over the ends of the legs. The spring 72 and spring retainer 54 are then slipped the ends of the legs 48. Because the assembly comprising the support 44, valve seat 42 and arms 48 are preferably made of a plastic material, the arms 48 are deflectably inwardly, permitting the stop surface 52 to be slipped over the ends of the arms and permitting the arms 48 to then snap back to catch the stop surface 52. It will be noted that, after assembly, the range of movement of the spring retainer 54 is limited by engagement of stop surface 52 with the detents 50 of arms 48 and by engagement of the gasket engaging surface 60 with the gasket 64. This range of movement is less than that necessary to collapse the spring 72 to a solid height. Accordingly, the chance that the spring 72 will take a set because of handling of the combination valve before assembly into the filter housing during, for example, assembly and shipping and handling of the combination valve 40 before assembly into the liquid filter, is substantially reduced. Accordingly, the pressure levels at which the relief valve portion 66 deflects to permit flow through the openings 68 should be consistent.

When the liquid filter 10 is assembled, the combination valve 40 is installed within the centertube 26 such that the portion of the end cap 24 adjacent the centertube 26 rests on the filter engaging surface 58. The centertube cap 28, which is integral with the leaf spring 30 is also installed on the filter cartridge 18. This assembly is then installed into the housing through the open end 16. Closure member 32 is then secured to the open end of the housing 12 in a manner well known to those skilled in the art. Because of the relative bias of the leaf spring 30, the spring retainer 54 is forced downwardly, viewing the Figures, thereby sealingly engaging the gasket engaging surface 60 with the gasket engaging area 62 of the gasket 64. When leaf spring 30 is compressed at assembly, coil spring 72 is compressed to its working height to provide desired load on relief valve gasket 64 and also to remove load from barbs 50 on arms 48. When the liquid filter 10 is used on a vehicle, lubricating oil communicates through the inlet openings 36 and deflects the anti-drainback portion 70 of the gasket 64 to permit flow of lubricating oil into the inlet chamber 38. However, when the engine is turned off, the anti-drainback portion 70 prevents flow of oil out of the inlet chamber 38 through the openings 36. During normal usage, the spring 72 maintains the relief valve portion 66 of the gasket 64 sealingly engaged with the valve seat 42, thereby precluding flow of lubricating oil through the relief openings 68. Accordingly, during normal use of the filter, oil is forced to flow into the inlet chamber 38, through the array of pleated filter paper 20, into the centertube 26 through the perforations therein, and then downwardly, viewing FIG. 1, through the outlet opening 34. However, if the oil flow through the element becomes impeded due to cold weather starts or a clogged filter element 18, the pressure differential across the filter element will increase markedly. When this pressure differential across the filter element reaches a pressure level such that the pressure of lubricating oil acting on relief valve portion 66 of the gasket 64 is sufficient to deflect the spring 72, lubricating oil flows through the relief valve openings 68 directly from the inlet openings to the centertube, thereby bypassing the filter element.

We claim:

1. Liquid filter comprising a housing having an open end, an annular filter element within said housing, a closure member closing said open end, said closure member having an outlet opening and circumferentially spaced inlet openings circumscribing said outlet opening, and a combination relief and anti-drainback valve for preventing drainback of liquid from said housing through said inlet openings and for permitting liquid to bypass said filter to flow directly from said inlet openings to said outlet opening when the pressure differential across said filter element attains a predetermined level, said combination valve including a circumferentially extending valve seat circumscribing said outlet opening and having relief opening means therethrough, a circumferentially extending resilient gasket circumscribing said valve seat to normally close said relief opening means, said gasket projecting radially therefrom to cover said inlet openings, a circumferentially extending spring retainer circumscribing said valve seat and having a circumferentially extending gasket engaging portion for engaging said gasket at a gasket engaging area located radially between said relief opening means and said inlet openings and an opposite filter element engaging surface, said spring retainer and said valve seat include cooperating stop means, and a spring yieldably urging said spring retainer away from said gasket engaging area and into a position in which the stop means on the retainer engage the stop means on the valve seat, for engagement of said filter element engaging surface with said filter element upon installation of the element and the combination valve into said housing said spring retainer is urged away from the stop means on the valve seat and toward said gasket in opposition to said spring to permit the gasket engaging portion to engage the gasket engaging area.

2. Liquid filter as claimed in claim 1, wherein said stop means on said valve seat include axially projecting arms carrying detents for engagement by said spring retainer, said retainer being urged away from said detentes against the force of the spring when the combination valve and the filter element are installed into said housing.

3. Liquid filter as claimed in claim 2, wherein the stop means on said spring retainer is a circumferentially extending rim.

4. Liquid filter as claimed in claim 1, wherein said spring yieldably maintains said gasket in sealing engagement with said valve seat, said spring yielding in response to a predetermined fluid pressure differential across said seat to thereupon permit fluid communication through said relief opening means.

5. Liquid filter as claimed in claim 10, wherein said gasket includes a relief valve portion extending radially inwardly from said gasket engaging area, said spring yieldably holding said relief valve portion against said valve seat.

6. Liquid filter as claimed in claim 10, wherein said gasket includes a relief valve portion extending radially inwardly from said gasket engaging area and an anti-drainback portion extending radially outwardly from said gasket engaging area.

7. Liquid filter as claimed in claim 6, wherein said spring yieldably holds said relief valve portion against said valve seat.

8. Liquid filter as claimed in claim 7, wherein said spring engages a circumferentially extending bearing plate, said bearing plate including a circumferentially extending surface engaging the relief valve portion of the gasket.

* * * * *